United States Patent [19]

Keating

[11] 4,452,221
[45] Jun. 5, 1984

[54] HIGH SQUISH DUAL SWIRL ENGINE COMBUSTION CHAMBER

[75] Inventor: Edward J. Keating, Mt. Morris, Mich.

[73] Assignee: General Motors Corporation, Detroit, Mich.

[21] Appl. No.: 479,141

[22] Filed: Mar. 28, 1983

[51] Int. Cl.³ .............................................. F02B 23/00
[52] U.S. Cl. .................................... 123/661; 123/664; 123/263; 123/281; 123/285
[58] Field of Search ............... 123/661, 664, 262, 263, 123/281, 282, 285

[56] References Cited

U.S. PATENT DOCUMENTS

| | | | |
|---|---|---|---|
| 1,717,578 | 6/1929 | Moore | 123/262 |
| 2,868,181 | 1/1959 | Dolza | 123/263 |
| 2,952,250 | 9/1960 | Henry-Biabaud . | |
| 3,443,552 | 5/1969 | Seggern et al. | 123/262 |
| 4,000,722 | 1/1977 | May . | |
| 4,094,272 | 6/1978 | May . | |
| 4,121,544 | 10/1978 | May . | |
| 4,182,280 | 1/1980 | Shekleton | 123/664 |
| 4,267,806 | 5/1981 | Kanda et al. . | |
| 4,300,498 | 11/1981 | May . | |
| 4,329,955 | 5/1982 | Muranaka et al. . | |

FOREIGN PATENT DOCUMENTS

| | | | |
|---|---|---|---|
| 110462 | 4/1928 | Austria | 123/262 |
| 1042947 | 11/1958 | Fed. Rep. of Germany | 123/262 |
| 1055874 | 4/1959 | Fed. Rep. of Germany | 123/262 |
| 219250 | 5/1942 | Switzerland | 123/664 |

*Primary Examiner*—Parshotam S. Lall
*Attorney, Agent, or Firm*—Robert J. Outland

[57] ABSTRACT

A high efficiency high ratio dual swirl combustion chamber of a spark ignition internal combustion engine includes in preferred embodiment opposing closely conforming squish surfaces with an eight (8) shaped subchamber recess formed of adjoining subcylinders with concave sides joining to provide opposed diametrically located projections that generate dual swirling turbulent mixture flow for ignition and combustion in the subchamber.

3 Claims, 5 Drawing Figures

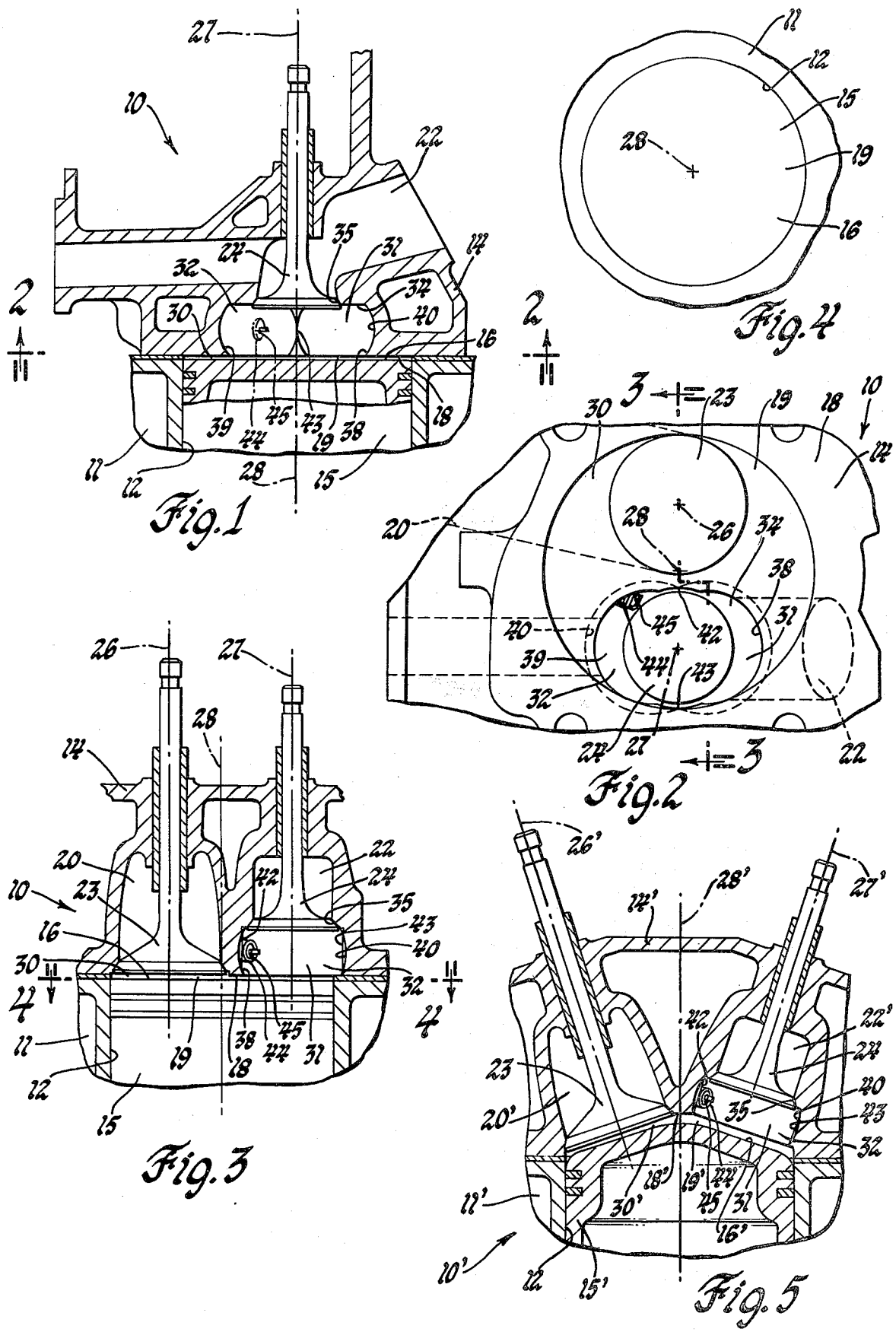

HIGH SQUISH DUAL SWIRL ENGINE COMBUSTION CHAMBER

TECHNICAL FIELD

This invention relates to combustion chambers for internal combustion engines and more particularly to high squish dual swirl combustion chamber configurations for spark ignition engines and the like.

BACKGROUND

Various types of high squish, swirl developing combustion chambers have been proposed for use in spark ignition internal combustion engines intended to operate efficiently at relatively high compression ratios while controlling knock and minimizing undesirable exhaust emissions by rapid and relatively complete combustion especially of lean mixtures. In general, designs of this type have utilized guide channels or grooves in the cylinder head and/or piston to direct into the swirl chamber the mixture flow generated by the squish area as the piston approaches its top dead center position. Dual spark plugs have also been proposed. However, the use of dual spark plugs adds complexity to an engine. Further, channels and grooves in the squish area of prior high ratio compact chamber engine combustion arrangements have been indicated as a source of hydrocarbon emissions, apparently resulting from increased squish clearance at the location of these features.

Accordingly I have desired to provide a high compression ratio, high air fuel ratio, fast mass burn rate, high squish compact combustion chamber design which is capable of obtaining the desired operating advantages of high performance, knock free operation without the use of guide channels or grooves in the combustion chamber squish area. In addition it is desired to provide these advantages through the use of a highly efficient swirl chamber arrangement preferably with the use of only a single spark plug or ignition device per cylinder.

SUMMARY OF THE INVENTION

The present invention provides an improved combustion chamber arrangement, particularly for spark ignition internal combustion engines, which provides the desired advantages of high compression ratio and efficient swirl development in a compact chamber that provides fast burn rate of high air/fuel ratio (lean) mixtures in an efficient and relatively complete manner. This is accomplished without the use of guide channels or grooves in the combustion chamber surfaces of the piston or cylinder head and without the necessity for multiple spark plugs.

In accordance with the invention, the combustion chamber comprises a large smooth surfaced squish area having, at one side, a subchamber formed in the cylinder head, the piston or portions of each. The subchamber consists of two small circular subcylinders adjoining and overlapping in such a way as to form a figure eight shaped recess when viewed in plan. The central portion of the recess defines two opposed wedge shaped projections at the intersections of the subcylinders. The projections are located diametrically of the engine cylinder to direct compressed mixtures from the adjacent squish area of the combustion chamber into an efficient dual swirl pattern in the sub-chamber recess. The combustion chamber further contains an intake valve located in the squish area, an exhaust valve opening into the subchamber and a spark plug in a wall of the subchamber preferably as near to the cylinder axis as possible.

These and other features and advantages of the invention will be more fully understood by reference to the following description of certain preferred embodiments taken together with the accompanying drawings.

BRIEF DRAWING DESCRIPTION

In the drawings:

FIG. 1 is a cross-sectional view of a portion of an internal combustion engine having a high ratio dual swirl (HRDS) combustion system and chamber arrangement in accordance with the invention;

FIG. 2 is a cross-sectional view showing the combustion chamber surface of the cylinder head as seen from the plane indicated by the line 2—2 of FIG. 1;

FIG. 3 is a cross-sectional view of the engine combustion chamber portions viewed from the plane indicated by the line 3—3 of FIG. 2;

FIG. 4 is a cross-sectional view showing the combustion chamber surface of the piston from the plane indicated by the line 4—4 of FIG. 3, and FIG. 5 is a cross-sectional view similar to FIG. 3 but showing the HRDS combustion system applied to an alternative embodiment of engine cylinder arrangement.

DETAILED DESCRIPTION

Referring first to FIGS. 1–4 of the drawings, there is shown a preferred embodiment of spark ignition internal combustion engine generally indicated by numeral 10 and including features of the HRDS combustion system in accordance with the invention. Engine 10 includes a cylinder block 11 defining at least one cylinder 12 closed at its upper end by a cylinder head 14 mounted on the cylinder block. A piston 15 disposed in the cylinder for reciprocation therein has a closed end 16 that faces a lower surface 18 of the cylinder head to define therebetween a combustion chamber 19.

The cylinder head includes intake and exhaust ports 20, 22 respectively which open through opposite sides of the cylinder head and communicate through the cylinder head lower surface 18 with the combustion chamber 19. Ports 20, 22 are provided respectively with intake and exhaust valves 23, 24 that are adapted to close or open the ports by reciprocation on axes 26, 27 respectively. The valve axes are parallel with the cylinder axis 28 and are disposed in a diametral plane on opposite sides of the cylinder axis.

The upper surface defined by the closed end 16 of the piston and the opposing lower surface 18 of the cylinder head, are flat (or closely conforming) to form a squish area 30 which is reduced to a very small volume when the piston reaches its top dead center position where there is a very small clearance between the opposing surfaces. At one side of the cylinder, centered on the axis of the exhaust valve, there is provided a subchamber 31 formed by a recess 32 in the cylinder head lower surface and comprising a portion of the combustion chamber 19. The upper wall 34 of the recess is flat and has a central valve seat 35 defining the lower end of the exhaust port on which the head of the exhaust valve 24 is seatable.

The subchamber 31 is formed by two adjoining and overlapping circular subcylinders 38, 39 which have concave outer walls 40 that intersect at spaced points of the cylinder diametral plane through the valve axes to form opposing wedge-shaped projections 42, 43. The projections extend inwardly along the diametral plane to divide the two part-cylindrical subcylinder portions of the subchamber recess. As previously mentioned, the walls of the subchamber are essentially concave at all points, with the exception of the flat roof 34 and the portions defining the ends of the projections 42, 43 which define essentially opposing flat surfaces.

The result is that the subchamber recess has the form, when viewed in plan, of essentially a figure eight (8) which is open between the two essentially cylindrical adjoining portions and has its inwardly extending pointed wedge-shaped projections aligned and coplanar with the valve axes and the associated combustion chamber ends of the intake and exhaust ports. It should be understood that the combustion chamber recess, instead of being located completely within the cylinder head, could equally well be disposed within the piston surface or partially within both the piston and the cylinder head.

A spark plug 44 carried in the cylinder head has a spark gap 45 opening into the subchamber recess through a side wall at a point preferably located as near to the cylinder axis as possible. In general the spark gap location will be closer to the cylinder axis than to the periphery of the cylinder or to the outer half of the subchamber recess.

In operation of the above-described embodiment, movement of the piston toward its top dead center position during its compression stroke compresses an air/fuel mixture previously drawn into the cylinder between the upper surface of the piston and the opposing lower surface of the cylinder head. Because of the close clearance between those portions of the opposing piston and head surfaces defining the squish area, the portion of fuel mixture located between them is squeezed out and forced by a rapid and strong flow into the subchamber 31.

Because of the subchamber location and orientation, the main portion of this squish induced flow is directed along the diametral plane connecting the intake and exhaust valve axes so that as it enters the subchamber, it is divided by the opposite wedge shaped projection 43 and directed into dual oppositely rotating swirl flows. These are maintained by the cylindrical subcylinders of the subchamber recess and its opposing wedge-shaped projections.

The concave outer walls of the recess have the effect of directing the swirling flow toward the vertical center of the recess, where the opposing swirls promote a more homogeneous mixture of air and fuel and also provide effective charge turbulence. Ignition of the charge by the single spark plug at the centrally located spark gap 45 therefore causes rapid combustion within the confined and compact area of the subchamber. Combustion ends during the expansion stroke with the end gas being located in the squish area opposite the cool intake valve, which serves to minimize engine knock even at high compression ratios. Because of the high turbulence and compact chamber, the engine may operate efficiently with lean air/fuel mixtures to realize gains in thermodynamic efficiency. Further, these gains are obtained without the use of guide channels or grooves in the combustion chamber surfaces or the need for multiple spark plugs, as are utilized in some prior configurations.

Referring now to FIG. 5, there is shown an alternative embodiment of engine combustion chamber configuration in accordance with the invention. To avoid repetition, components similar to those of the first described embodiment are indicated by like reference numerals and primed numerals are used to indicate modified components.

The FIG. 5 embodiment differs from that previously described in that, as the figure indicates, the piston 15' has a domed head 16' defining a closed end which closely approaches the conforming dome shaped recess in the lower surface 18' of the cylinder head. The subchamber 31 with its associated exhaust valve 24 is arranged with similar configuration and in similar relationship to the intake port 20 and valve 23 of the first described embodiment, except that these elements are aligned on splayed axes 26', 27' perpendicular to the angled surfaces of the connecting domed chamber. Nevertheless the valve axes and the opposed wedge-shaped projections 42, 43 of the subchamber again lie on a diametral plane through the cylinder axis as in the first described embodiment. Operation of the alternative embodiment of FIG. 5 is essentially as previously described.

Thus, according to the invention, a figure eight (8) shaped subchamber is provided recessed into the conforming surface or surfaces of the opposed ends of a piston and cylinder with the remaining surface forming a squish area. The subchamber is formed in substantially a figure eight (8) when viewed in plan having opposed diametrical wedge-shaped projections separating adjoining subcylindrical portions which generate opposite dual swirling flows in mixtures compressed into the subchamber recess. Concave walls direct the swirl flows toward the vertical central of the subchamber. The overall effect is the establishment of swirling turbulent flow which enables combustion of lean mixtures with high compression ratios and resultant improvements in fuel consumption and emissions without knock.

While the invention has been described by reference to certain preferred embodiments chosen for purposes of illustration, it should be understood that numerous changes or variations could be made without departing from the spirit and scope of the inventive concepts described. Accordingly it is intended that the invention not be limited to the described embodiments but that it have the full scope permitted by the language of the following claims.

The embodiments of the invention in which an exclusive property or privilege is claimed are defined as follows:

1. A combustion chamber of an internal combustion engine defined between a cylinder having an axis and a piston reciprocable in the cylinder, said combustion chamber comprising essentially conforming opposing end surfaces of said piston and cylinder disposed in close opposition at the piston top dead center position and defining a squish area, and a subchamber in one side of said squish area and extending into at least one of said end surfaces to define an essentially eight (8) shaped cross section when viewed in plan, said subchamber being formed by two smaller essentially circular adjoining subcylinders having walls intersecting essentially in a diametral plane of said cylinder dividing the subchamber, to form at the intersecting edges of the subcylinders opposing wedge-like wall projections lying essentially in said diametral plane, an exhaust valve opening to said subchamber between said projections, an ignition device within said subchamber nearer to the cylinder axis than to its periphery, and an intake valve opening to the combustion chamber in said squish area opposite the subchamber and in said diametral plane, said squish area being effective during the piston compression stroke to force compressed charges into said subchamber, largely from across said cylinder, to be guided by said projections into dual swirling flows that maximize the combustion rate when the charges are ignited by the ignition means near the piston top dead center position.

2. A combustion chamber of an internal combustion engine defined between a cylinder having an axis and a piston reciprocable in the cylinder, said combustion chamber comprising essentially conforming opposing end surfaces of said piston and cylinder disposed in close opposition at the piston top dead center position and defining a squish area, and a subchamber in one side of said squish area and extending into at least one of said end surfaces to define an essentially eight (8) shaped cross section when viewed in plan, said subchamber being formed by two smaller essentially circular adjoining subcylinders having concave walls intersecting essentially in a diametral plane of said cylinder dividing the subchamber, to form at the intersecting edges of the subcylinders opposing wedge-like wall projections lying essentially in said diametral plane, an exhaust valve opening to said subchamber between said projections, an ignition device within said subchamber nearer to the cylinder axis than to its periphery, and an intake valve opening to the combustion chamber in said squish area opposite the subchamber and in said diametral plane, said squish area being effective during the piston compression stroke to force compressed charges into said subchamber, largely from across said cylinder, to be guided by said projections into dual swirling flows that maximize the combustion rate when the charges are ignited by the ignition means near the piston top dead center position, said cylinder and piston closed ends being essentially devoid of grooves and recesses other than said subchamber to minimize exhaust emission causing crevice effects.

3. A combustion chamber of an internal combustion engine defined between a cylinder having an axis and a piston reciprocable in the cylinder, said combustion chamber comprising essentially conforming opposing end surfaces of said piston and cylinder disposed in close opposition at the piston top dead center position and defining a squish area, and a subchamber in one side of said squish area and extending into at least one of said end surfaces to define an essentially eight (8) shaped cross section when viewed in plane, said subchamber being formed by two smaller adjoining subcylinders of curvilinear periphery and having walls intersecting essentially in a diametral plane of said cylinder dividing the subchamber, to form at the intersecting edges of the subcylinders opposing wedge-like wall projections lying essentially in said diametral plane, an exhaust valve opening to said subchamber, an ignition device within said subchamber and an intake valve opening to the combustion chamber in said squish area opposite the subchamber, said squish area being effective during the piston compression stroke to force compressed charges into said subchamber, largely from across said cylinder, to be guided by said projections into dual swirling flows that maximize the combustion rate when the charges are ignited by the ignition means near the piston top dead center position.

* * * * *

UNITED STATES PATENT AND TRADEMARK OFFICE
CERTIFICATE OF CORRECTION

PATENT NO. : 4,452,221
DATED : June 5, 1984
INVENTOR(S) : Edward J. Keating

It is certified that error appears in the above-identified patent and that said Letters Patent is hereby corrected as shown below:

Column 6, line 16, "plane" should be -- plan --.

Signed and Sealed this

Eighteenth Day of June 1985

[SEAL]

Attest:

DONALD J. QUIGG

Attesting Officer   Acting Commissioner of Patents and Trademarks